United States Patent [19]

Concannon et al.

[11] Patent Number: 4,478,965

[45] Date of Patent: Oct. 23, 1984

[54] MELT PROCESSABLE PERFLUOROCARBON RESIN WITH DEGRADATION RETARDER

[75] Inventors: Thomas P. Concannon, Newtown Square; Mitzie K. Rummel, Secane, both of Pa.

[73] Assignee: E. I. Du Pont de Nemours and Company, Wilmington, Del.

[21] Appl. No.: 380,354

[22] Filed: May 20, 1982

[51] Int. Cl.$^3$ .......................... C08K 3/10; C08K 3/34; C08L 27/18

[52] U.S. Cl. ..................... 523/218; 523/310; 524/413; 524/431; 524/443; 524/449; 524/450; 524/546

[58] Field of Search ................ 523/310, 218; 524/546, 524/431, 450, 449, 443

[56] References Cited

U.S. PATENT DOCUMENTS

| | | | |
|---|---|---|---|
| 2,867,605 | 1/1959 | Safford | 524/450 |
| 3,245,946 | 4/1966 | O'Connor et al. | 523/211 |
| 3,428,595 | 2/1969 | Tsukada et al. | 524/450 |
| 3,538,028 | 11/1970 | Morgan | 524/443 |
| 3,850,867 | 11/1974 | Hartmann | 524/443 |
| 4,000,100 | 12/1976 | Baldyga | 524/450 |
| 4,169,083 | 9/1979 | Vassiliou | 524/546 |
| 4,180,609 | 12/1979 | Vassiliou | 524/449 |
| 4,248,763 | 2/1981 | Yoshimura et al. | 524/546 |
| 4,276,214 | 6/1981 | Yoshimura et al. | 524/546 |
| 4,307,010 | 12/1981 | Sandler et al. | 524/450 |
| 4,338,226 | 7/1982 | Worschech et al. | 524/450 |
| 4,371,656 | 2/1983 | Kashiwase et al. | 524/450 |

FOREIGN PATENT DOCUMENTS

| | | | |
|---|---|---|---|
| 6493 | 9/1980 | European Pat. Off. | |
| 54-34356 | 3/1979 | Japan | |
| 54-149745 | 11/1979 | Japan | |
| 164236 | 12/1980 | Japan | 524/443 |
| 56-147851 | 11/1981 | Japan | |
| 57-25346 | 2/1982 | Japan | |
| 57-28145 | 2/1982 | Japan | |
| 98761 | 8/1961 | Netherlands | 524/450 |

OTHER PUBLICATIONS

Chem. Abs. 94–17681t, Vassiliou Eur. Pat. 22257, Jan. 1981.
Chem. Abs. 85–200552y, Hamamoto et al., Apr. 1976, Japan K 76-47431.
Kunststoff-Hundbuch Band XI, p. 409, Carl Hanser Verlag-Munich, (1971).

Primary Examiner—Herbert J. Lilling

[57] ABSTRACT

Zeolites, including ultramarine blue retard the oxidative degradation of melt processible perfluorocarbon resins including FEP and PFA at elevated temperatures. Coating compositions of the perfluorocarbon resin, zeolite, and iron-containing pigments are provided.

15 Claims, No Drawings

MELT PROCESSABLE PERFLUOROCARBON RESIN WITH DEGRADATION RETARDER

BACKGROUND

This invention relates to melt processable perfluorocarbon resin compositions containing degradation retarders. More particularly it relates to such compositions of zeolites and a copolymer of tetrafluoroethylene (TFE) with hexafluoropropylene (HFP) known as FEP, a copolymer of TFE with perfluoropropylvinyl ether (PPVE) known as PFA, and a terpolymer of TFE, HFP and PPVE.

Various materials have been found to be useful in retarding the degradation of many polymer systems upon exposure to elevated temperatures or to radiation, particularly ultraviolet light. Often oxygen from the air enhances degradation.

Organo-sulfur compounds and various organo-metallic compounds and hindered amines are used to retard degradation of polymers meant to be used at ordinary temperatures such as 0°–100° C. by stabilizing the polymer against the effects of ultraviolet light. At higher application temperatures, rubber, plastics, and such hydrogen-containing halogenated hydrocarbon resins as polyvinyl chloride (PVC), polyvinyl fluroide (PVF) and polyvinylidene fluoride ($PVF_2$) have been protected from degradation by the use of various types of zeolites. Some patent references say it is important to use zeolites which have been activated by driving off more or less of the contained water of hydration; others say they should be unactivated. Some say the zeolites should be ion-exchanged with monovalent metals like sodium; others say divalent metals like calcium are necessary. Some say at least minimum ion exchange capacity is important; some use two types of zeolites with differing pore size and water content, and still others also require additional retarders to work in conjunction with the zeolites.

However, the patents and publications described above deal with hydrogen-containing resins and not with perfluorocarbon resins such as PFA and FEP. Partially because of the lack of hydrogen, perfluorocarbon resins such as PFA can be used continuously at much higher temperatures than $PVF_2$ without substantial loss of function, perhaps 260° C. for PFA and 205° C. for FEP versus 150° C. for $PVF_2$ and PVF, and 80°–120° C. for PVC. While the mechanisms of oxidative and thermal degradation of perfluorocarbon resins may not be completely understood, they do not include to a substantial extent one of the primary mechanisms in PVC, PVF and $PVF_2$, dehydrohalogenation, since the perfluorocarbon resins do not include hydrogen in the polymer.

The predominant mechanisms of degradation in perfluorocarbon resins may include formation of peroxides and chain-cission, leading to lower molecular weight species. Even perfluorocarbon resins tend to have functional end groups such as carboxylic acid groups. These can complicate any study of the degradation mechanisms, especially where the molecular weight of the resin decreases during the degradative process. Considering the higher temperature capabilities of PFA and FEP compared to $PVF_2$, one cannot forecast what will happen with the perfluorocarbon resins from what has been tried with $PVF_2$, especially when applying the perfluorocarbon resins to uses at temperatures higher than the highest at which $PVF_2$ can be used.

Melt processable fluorine-containing resins, including polymers of tetrafluoroethylene such as with hexafluoropropylene, known as FEP, and also chlorotrifluoroethylene (CTFE) and PVF, but not including polytetrafluoroethylene homopolymer itself, are the subject of U.S. Pat. No. 4,248,763—Yoshimura, et al. (Feb. 3, 1981). That patent uses as a combination of an amine antioxidant, an organosufurous compound, and at least one of carbon black and iron, nickel or cobalt to obtain improved thermal stability in the melt processable fluorine-containing resin. Although some of these resins are perfluorocarbon resins, others contain hydrogen. The maximum use temperatures for the hydrogen-containing polymers are not as high as those for PFA and FEP, and several of the cited additives tend to be consumed rapidly at temperatures below the maximum use temperatures for PFA and FEP.

Coating compositions containing PTFE, FEP, PFA and other perfluorocarbon resins separately or in combination, in formulations suitable for industrial and cookware applications, are known in several U.S. patents, including U.S. Pat. No. 4,252,859—Concannon and Vary (Feb. 24, 1981);

U.S. Pat. No. 4,123,401—Berghmans et al. (Oct. 31, 1978);

U.S. Pat. No. 4,143,204—Fang (Mar. 6, 1979);

U.S. Pat. No. 4,145,325—Vassiliou, et al. (Mar. 20, 1979);

U.S. Pat. No. 4,147,683—Vassiliou, et al. (Apr. 3, 1979);

U.S. Pat. No. 4,150,008—Vassiliou, et al. (Apr. 17, 1979);

U.S. Pat. No. 4,169,083—Vassiliou (Sept. 25, 1979);

U.S. Pat. No. 4,180,609—Vassiliou (Dec. 25, 1979); and

U.S. Pat. No. 4,311,634—Vassiliou (Jan. 19, 1982), all of which are hereby incorporated herein by reference.

Zeolites are reversibly hydrated aluminum silicates generally containing alkali or alkaline earth metal oxides which sometimes can be ion exchanged for other metals or for hydrogen. A general structural definition is

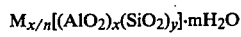

$$M_{x/n}[(AlO_2)_x(SiO_2)_y]\cdot mH_2O$$

wherein M is a cation of valence n, and n is 1 or 2. The ratio of x to y can vary from 1 to a large number, as is known in the art. Zeolites have a framework structure often permitting their use as molecular sieves after removing the water which can leave a void volume (depending on the value of m) of up to 50% with a narrowly defined pore size on the order of a few microns. Zeolites include many naturally occurring minerals and synthetic materials. The class of minerals known as feldspathiods is closely related to zeolites and is included herein in the meaning of the term zeolite. Feldspathoids, including sodalite and ultramarine, are more open in structure with large cavities than feldspars which are anhydrous. Thus, feldspathoids are more closely related to other zeolites than to feldspars.

Ultramarine blue is known as a heat-resistant pigment for use in $PVF_2$. See Kunststoff-Handbuch, Band XI, p. 409, Carl Hanser Verlag-Munich (1971).

SUMMARY OF THE INVENTION

The present invention provides compositions, including coating compositions, of melt processable perfluorocarbon resins having a melt viscosity at temperatures below 380° C. of less than about $10^6$ poises (including FEP and PFA) and zeolites which act as degradation retarders at elevated temperatures. Ultramarine blue contains sulfur species trapped in a cage structure from which it can be released gradually over an extended period of time (time release). Ultramarine blue is a preferred zeolite. Other zeolites containing sulfur or phosphorus, or even selenium or tellurium, in a crystallographic structure permitting similar time release may also be particularly desirable.

The coating compositions preferably include unsaturated hydrocarbon polymer, such as an acrylic resin, which decomposes at elevated temperatures to enhance the coalescence of the perfluorocarbon resin into the form of a film. These coating compositions also generally include a pigment, mica or a pigment-coated mica. The mica can give a sparkling appearance and tend to mask penetrating stains. When the pigment used as such or as a coating on the mica is an iron-containing pigment, to obtain certain colors or for any other reason, the iron content tends to enhance degradation of the perfluorocarbon resin at elevated temperatures. The cause is not known with certainty, but there may be some catalytic effect taking place with the iron oxide catalyzing the formation of peroxides which lead to degradation of the perfluorocarbon resin.

DETAILED DISCLOSURE OF THE PREFERRED EMBODIMENTS

The degradation of melt processible perfluorocarbon polymers such as PFA and FEP at elevated temperatures in air is difficult to monitor. Because the inherent elevated temperature capabilities of PFA and FEP are so good, there seems to have been less effort directed toward further improving the elevated temperature capabilities for them than for other lower temperature polymers such as PVC and $PVF_2$. However, above certain temperatures PFA and FEP are not useful, and they do very slowly degrade even at certain high temperatures at which they are normally used.

We have found that iron oxide pigments have a tendency to accelerate the degradation of PFA at elevated temperatures and that ultramarine blue and other zeolites provided as a particulate pigment tends to counteract that tendency.

EXAMPLES

To demonstrate these effects, films were made of PFA itself, with ultramarine blue, with red iron oxide and with both red iron oxide and ultramarine blue. The films were made on aluminum foil and cured 15 minutes at 177° C. and 5 minutes at 427° C., then the aluminum foil was removed by dissolving it with hydrochloric acid. The samples were made as shown in Tables I and II below. (Parts, proportions and percentages herein are by weight except where indicated otherwise.)

TABLE I

| | |
|---|---|
| A | PFA aqueous dispersion of fluorinated ethylene perfluoroalkyl vinyl ether copolymer of TFE and PPVE in a ratio of 97:3 at 55% copolymer solids with 5.5% isooctylphenoxy polyethoxyethanol "Triton X-100" from Rohm and Haas, particle size 0.12–0.25 μm average diameter measured optically. |
| B | Acrylic resin solution acrylic latex polymer of methylmethacrylate, ethyl acrylate and methacrylic acid in a ratio of 39/57/4, at a concentration of 40% dispersed in water. |
| C | Cerium octoate solution, containing 1.07% cerium being a blend of: |
| | 4.69% cerium octoate (23% cerium) |
| | 12.43 dithylene glycol monobutyl ether |
| | 31.02 hydrocarbon solvent, 95% aromatic (Solvesso 100 from Exxon Chemical) |

TABLE I-continued

| | |
|---|---|
| | 37.02 triethanolamine |
| | 9.85 oleic acid |
| | 4.99 Triton X-100 surfactant |
| D | Red iron oxide pigment millbase of: |
| | 45.0% calcined red $Fe_2O_3$ pigment R-2200 from Pfizer |
| | 54.5 deionized water |
| | 0.5 sodium lauryl sulfonate surfactant "Tamol SN" from Rohm & Haas |
| E | Ultramarine blue pigment millbase |
| | 45.01% Ultramarine blue 5016 pigment coated with silica for acid resistance, made by Reckitts Colours Ltd. and sold by Whittaker, Clark & Daniels, Inc. |
| | 0.25 Triton X-100 surfactant |
| | 0.25 "Busperse 53" polymeric antiform agent from Buckman Laboratories International |
| | 0.25 triethanolamine |
| | 55.24 deionized water |

Each of these ingredients is blended separately, and then they are combined and blended to form dispersions of the following compositions:

TABLE II

| Sample | | | |
|---|---|---|---|
| 1 | A | PFA dispersion | 186.57 |
| | B | Cerium octoate solution | 18.66 |
| 2 | A | PFA dispersion | 186.66 |
| | B | Cerium octoate solution | 18.66 |
| | C | Red iron oxide millbase | 4.4 |
| 3 | A | PFA dispersion | 186.57 |
| | B | Cerium octoate solution | 18.66 |
| | D | Ultramarine blue millbase | 4.4 |
| 4 | A | PFA dispersion | 186.57 |
| | B | Cerium octoate solution | 18.66 |
| | C | Red iron oxide millbase | 4.4 |
| | D | Ultramarine blue millbase | 4.4 |

Free film samples were mounted in a frame holder of the type used for infrared analysis and were heated to 290° C. in air in a convection oven for 72 hours. At the end of this time, the samples without ultramarine blue had partially fallen apart, leaving a large hole in the middle, while the samples with ultramarine blue were still in the form of integral films, showing much less degradation.

Nuclear magnetic resonance (NMR) tests were run to determine the effect of ultramarine blue and other zeolites on degradation of PFA. As PFA degrades at elevated temperatures in air, the PPVE group tends to disappear, converting the PFA into a polymer closer to PTFE but probably with a lower and less desirable molecular weight than the commercial PTFE resin. Also, the advantages of PFA itself are lost.

NMR is used to monitor the $F^{19}$ configuration, showing how large a proportion of the fluorine atoms are in certain molecular positions including those identified with the PPVE ether group.

NMR data are reported in terms of peak height (intensity), peak width at the half height (line broadening from a number of causes) and the area under a peak. The relative areas of peaks associated with two different fluorine configurations, in the TFE backbone position and the PPVE ether oxygen position, approximates the molar ratio of TFE to PPVE in the polymer. Such peaks are measured at and reported in terms of parts per million (ppm) of the frequency of the exciting magnetic field. Thus, for instance, for an NMR apparatus using a 184 megahertz field, 1 ppm would be a frequency of 184 hertz. As is known in the art, the sample being analyzed is magnetically excited and then a spectra is obtained of frequency versus intensity of the resonant behavior of the sample on decay of the excitation.

One set of samples contained PFA, acrylic polymer to aid in film coalescence, cerium octoate to aid in burning out the acrylic polymer and Triton X-100 surfactant to aid in pigment dispersion, iron oxide pigments to accelerate degradation and to simulate colors used commercially, and optionally ultramarine blue. The formulation is given in Table III below

TABLE III

| Sample | | | |
|---|---|---|---|
| 5 | A | PFA | 70.03 |
|   |   | Triton X-100 | 1.95 |
|   | C | Cerium octoate | 11.78 |
|   | B | Acrylic polymer | 11.69 |
|   |   | Deionized water | 10.88 |
| 6 |   | Sample 5 | 106.33 |
|   | D | Red iron oxide | 1.70 |
| 7 |   | Sample 5 | 98.99 |
|   | E | Ultramarine blue | 1.70 |
| 8 |   | Sample 5 | 106.33 |
|   | D | Red iron oxide | 1.70 |
|   | E | Ultramarine blue | 1.70 |

The samples were prepared as described above for samples 1–4. The peaks near 80-83 ppm indicate PPVE. Samples 5, 7 and 8 showed the same amounts of PPVE, not showing any loss from degradation. Sample 6 had no such peak, indicating the PPVE had disappeared.

In another set of NMR tests in which the samples contained similar proportions of PFA, acrylic polymer, cerium octoate, and optional iron oxide, ultramarine blue and several other types of zeolites added in the same proportions as the ultramarine blue, the line width broadening of the peak near 120 ppm was measured at 340° C. While increased amounts of iron oxide showed greater broadening, indicating a paramagnetic effect of the iron oxide, when the iron oxide was held constant differences were detected depending on the type of zeolite. Such increased line broadening (as well as the total area under the 120 ppm peak) is thought to be related to the disappearance of PPVE. Ultramarine blue, with its sulfur content and presumed time release phenomena, gave a line broadening of 7.6 ppm. The other zeolites gave line broadening of 11.5 up to 12.6 ppm, versus 16.5 for a sample including iron oxide but not any zeolite. This indicates that all the zeolites tested were effective but that ultramarine blue was by far the most effective in retarding degradation of PFA. Values obtained with certain zeolites are given in Table IV below.

TABLE IV

| Sample | Zeolite | Half Height Width of 120 ppm line (ppm) |
|---|---|---|
| 9 | Ultramarine blue | 7.6 |
| 10 | LZY-82 | 11.0 |
| 11 | Omega | 11.3 |
| 12 | ZSM-3 | 11.4 |
| 13 | M-8 | 11.5 |
| 14 | Beta | 11.5 |
| 15 | LZY-82 | 11.6 |
| 16 | Ferrierite | 11.7 |
| 17 | Erionite | 11.7 |
| 18 | ELZ-20 | 11.9 |
| 19 | ZSM-4 | 12.0 |
| 20 | Rho | 12.0 |
| 21 | H.S. Sodalite | 12.3 |
| 22 | Chabazite | 12.3 |
| 23 | ZSM-5 | 12.3 |
| 24 | ELZ-L | 12.4 |
| 25 | LZY-52 | 12.6 |
| 26 | Iron oxide - no zeolite | 16.5 |

In still another set of NMR tests on similar samples, the peak area ratios were measured at 300° C., giving the results in Table V below.

TABLE V

| Sample | Composition | Mole % PPVE |
|---|---|---|
| 27 | PFA, no Ce, acrylic or Fe | 1.4 |
| 28 | PFA, Ce acrylic | 1.4 |
| 29 | PFA, Ce, acrylic, Fe | 0.1 |
| 30 | PFA, Fe, no Ce or acrylic | 0.5 |
| 31 | PFA, Ce, acrylic, Fe, ultramarine blue | 0.8 |
| 32 | PFA, Ce, acrylic, Fe, H.S. Sodalite | 0.3 |
| 33 | PFA, Ce, acrylic, Fe, M-8 zeolite | 0.5 |

Another series of tests used infrared analysis of thermal effluents (IRate) to determine what effect ultramarine blue had on degradation. Samples similar to those discussed above were tested, comparing PFA alone, PFA with iron oxide, PFA with ultramarine blue, and PFA with both iron oxide and ultramarine blue. The tests were performed by heating the samples from room temperature to 400° C. in 15 minutes, holding at 400° C. for 85 minutes, and then heating from 400° C. to 450° C. over a period of 80 minutes. Between 400° and 450° C., some HFP and some silicon tetrafluoride were detected, indicating PFA degradation. The $SiF_4$ apparently came from fluorine reacting with glass in the equipment. The results showed that the iron oxide increased the rate of PFA degradation while the ultramarine blue cut the rate about in half, with or without iron oxide present. Also some $SO_2$ was detected between 400° and 450° C., demonstrating a time release phenomena. In addition to the demonstrated benefits of zeolites in general, the time release of sulfur from ultramarine blue appears to give further assistance in retarding the degradation of perfluorocarbon resins.

As is known in the art, zinc can be added to the ultramarine blue to aid in fixing the sulfur-containing effluents or in slowing down their rate of effluence when desired.

We claim:

1. A composition consisting essentially of perfluorocarbon resin and zeolite, said composition having a melt viscosity at temperatures below 380° C. of less than $10^6$ poises.

2. The composition of claim 1 in which the perfluorocarbon resin is at least one of a copolymer of tetrafluoroethylene and hexafluoropropylene and a copolymer of tetrafluoroethylene with perfluoropropylvinyl ether.

3. The composition of claim 2 in which the perfluorocarbon resin is a copolymer of tetrafluoroethylene with hexafluoropropylene.

4. The composition of claim 2 in which the perfluorocarbon resin is a copolymer of tetrafluoroethylene with perfluoropropylvinyl ether.

5. The composition of claim 1 in which the zeolite acts to retard oxidative degradation of the perfluorocarbon resin at elevated temperatures.

6. The composition of claim 1 in which the zeolite contains sulfur or phosphorus in a crystallographic configuration which permits gradual release of the sulfur or phosphorus.

7. The composition of claim 1 in which the zeolite is ultramarine blue.

8. A coating composition comprising the composition of claim 1.

9. A coating composition comprising the composition of claim 2.

10. The coating composition of claim 9 also containing an unsaturated hydrocarbon polymer which decomposes at elevated temperatures but below the melting point of the perfluorocarbon resin.

11. The coating composition of claim 10 in which the unsaturated hydrocarbon polymer acts as a coalescing aid to enhance film formation by the perfluorocarbon resin.

12. The coating composition of claim 10 in which the unsaturated hydrocarbon polymer is an acrylic polymer and which also contains an oxidation catalyst to aid in decomposing the acrylic polymer.

13. The coating composition of claim 12 which also contains at least one of pigment, mica, and pigment-coated mica.

14. The coating composition of claim 13 in which the pigment includes an iron oxide.

15. The coating composition of claim 14 in which the zeolite is ultramarine blue.

* * * * *